United States Patent [19]

Jacobson

[11] Patent Number: 4,744,261
[45] Date of Patent: May 17, 1988

[54] BALL COUPLED COMPOUND TRACTION DRIVE

[75] Inventor: Peter E. Jacobson, Phoenix, Ariz.

[73] Assignee: Honeywell Inc., Minneapolis, Minn.

[21] Appl. No.: 36,148

[22] Filed: Apr. 3, 1987

Related U.S. Application Data

[63] Continuation of Ser. No. 802,565, Nov. 27, 1985, abandoned.

[51] Int. Cl.⁴ ............................................. F16H 15/26
[52] U.S. Cl. ..................................... 74/198; 74/190.5; 74/196
[58] Field of Search ...................... 74/198, 196, 190.5, 74/190, 200, 690, 796, 191, 193

[56] References Cited

U.S. PATENT DOCUMENTS

| | | | |
|---|---|---|---|
| 2,299,857 | 10/1942 | Solness | 74/198 |
| 2,675,713 | 4/1954 | Acker | 74/200 |
| 2,850,910 | 9/1958 | Kraus | 74/190.5 |
| 2,905,026 | 9/1959 | Oehrli | 74/190.5 |
| 2,974,547 | 3/1961 | Egan | 74/796 |

FOREIGN PATENT DOCUMENTS 459388  9/1949  Canada ..................... 74/198

Primary Examiner—Randolph A. Reese
Assistant Examiner—Peter M. Cuomo
Attorney, Agent, or Firm—Seymour Levine; Albin Medved

[57] ABSTRACT

A variable ratio traction drive employing a set of geometrically skewed axis drive balls mounted in an input carrier and captured between a split outer ring. An alteration of the axis skew angle of the balls causes a turns ratio change in the traction drive.

2 Claims, 6 Drawing Sheets

BALL COUPLED COMPOUND TRACTION DRIVE

This is a continuation of co-pending application Ser. No. 802,565, filed on Nov. 27, 1985, now abandoned.

BACKGROUND OF THE INVENTION

1. Field of the Invention

This invention relates to improvements in traction drives and more particularly to providing a drive with improved volumetric, envelope and weight characteristics as well as providing a convenient means of changing the turns ratio.

2. Description of the Prior Art

Traction drives utilize smooth continuous surface rolling elements to effect a given turns ratio between an input and an output member. The drive components are usually lubricated with a traction fluid such as Monsantos Santotrac fluids. These are typically synthetic high traction cycloaliphatic hydrocarbons. The traction coefficient of the fluid is approximately 50 percent greater than available from conventional mineral oils. This coefficient represents the maximum available traction forces which would be available at the interfaces of the contacting components and is a measure of the maximum available drive torque. When this torque is exceeded, unacceptable gross slippage occurs. A slip of less than 3 percent is normal for most traction drives. Drives are sometimes advertised as "non-slip" but in reality always have some small value of micro-creep.

The various drive components in conventional traction drives are shaped in a variety of ways. Most common are rings, cones and cylinders. Many of these drives are combined with conventional gear components to effect a given turns ratio.

Conventional traction drives present a number of undesirable characteristics. For instance, many are bulky and present undesirable diameter, length and volume envelopes such as is the case with a nutating drive assembly which uses double cones rolling and nutating inside two fixed rings. The drive components of this concept are also complex to fabricate. Another bulky, complex transmission, uses four fixed cones which are loaded against, and impart rotation to a movable roller. This concept also uses a combination of gearing and traction drive to effect a total turns ratio.

Another example is a twin pulley transmission which uses a pair of steel V-belts to tractively drive an output shaft. This drive is also bulky and complex even when limited to a single drive ratio.

The NASA Lewis Research Center has developed a traction drive which consists of a single stage planetary roller with two rows of five stepped planetary rollers contained between concentric sun and ring rollers. This transmission is compact but does not offer the advantages of turns ratio adjustment.

SUMMARY OF THE INVENTION

The present invention provides a variable ratio traction drive which achieves the required turns ratio by means of a set of geometrically simple skewed axis, drive balls which are mounted in an input carrier member and which are captured between a split outer ring, one half being fixed to the frame and the other half forming the output member. The resultant drive fits compactly inside the cavity of an inner member drive such as a pancake torquer. It is simply mechanically and accommodates turns ratio changes simply by changing the ball axis skew angle.

DESCRIPTION OF THE PREFERRED EMBODIMENT

Figure 1:
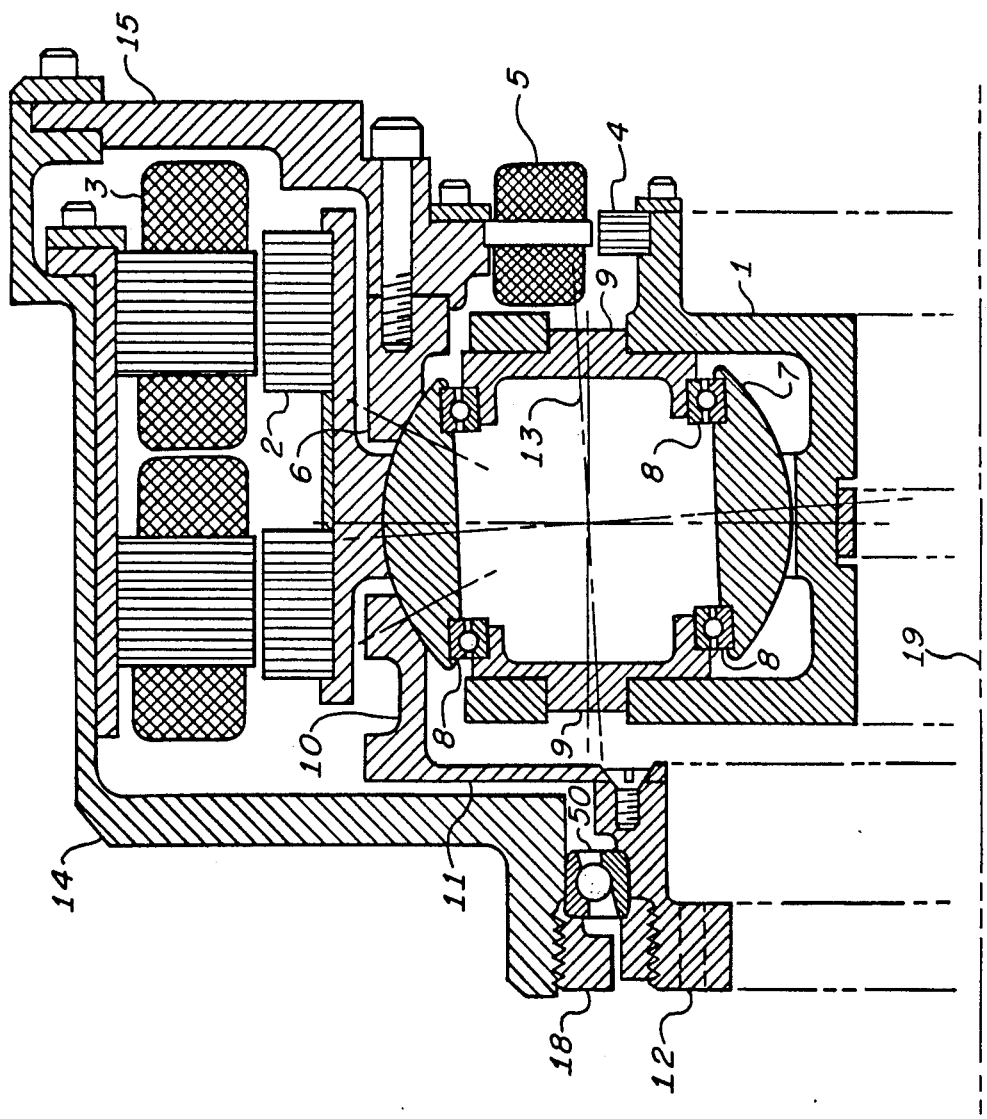
FIG. 1 is a half view cross-section of a representative drive and is an example of one embodiment of this invention.

Referring to FIG. 1, the ball-coupled compound traction drive comprises an input carrier member 1 supported by a set of balls 7 by means of bearings 8 within outer bearing race rings 6 and 10, ring 6 being fixed to housing member 15 and output ring 10 being fixed to the housing member 14 by means of the preload diaphragm 11, output member 12 and output member bearing (or bearings) 50. The drive motor armature 2 is mounted to the input member 1 as the drive input position resolver armature 4. It is evident that alternate or additional drive motors or means (gears, thumb wheels) as well as additional sensors (angular position, rate and/or acceleration) could be attached to input member 1. For the illustrated embodiment the drive motor and position resolver stators 3 and 5, respectively, are attached to housing components 14 and 15, respectively.

Figure 2:
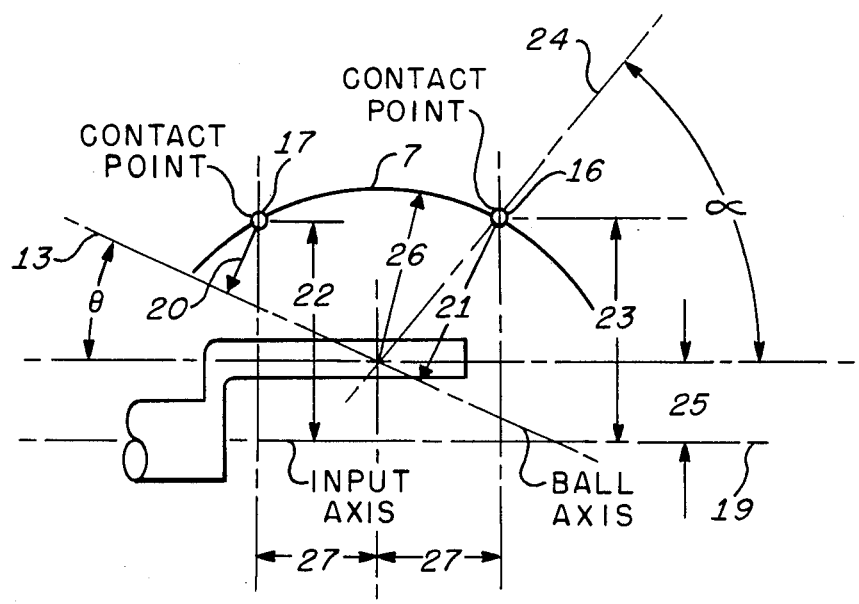
FIG. 2 is a mechanical schematic of the drive elements shown in FIG. 1.

The turns ratio between input member 1 and output member 12 is determined by the position of the ball rotational axis 13 relative to the input member 1 rotational axis (19). FIG. 2 identifies the applicable nomenclature. In FIG. 2, the skew of the ball rotational axis 13 through the angle $\theta$ results in differential ball radii 20 and 21 to contact points 17 and 16 respectively. The radii of the two ring members 10 and 6 in FIG. 1 are identified as 22 and 23 respectively in FIG. 2 and do not change when the skew angle is changed. Radii 22 and 23 are equal. The location of the contact point 16 is determined by the ball 7 center radial offset distance 25 from input member rotational axis 19, ball 7 radius 26 and axial dimensions 27 and is also located through angle $\alpha$. The turns ratio, TR, between output member 12 and input member 1 may be expressed by:

$$TR = \frac{\text{SIN}(\alpha - \phi)}{\text{SIN}(\alpha - \phi) - \text{SIN}(\alpha + \phi)}$$

Once the angle $\alpha$ has been established for a given design, the ball skew angle $\theta$ may be selected to effect a turns ratio change by adjustment of replacement of the ball carrier elements 9 shown in FIG. 1. The ball rotational axis 13 is controlled by the ball carrier elements 9 which supports the balls 7 through the carrier bearings 8. The two members may be identical but are assembled in a 180° orientation as shown in FIG. 1.

Figure 3:
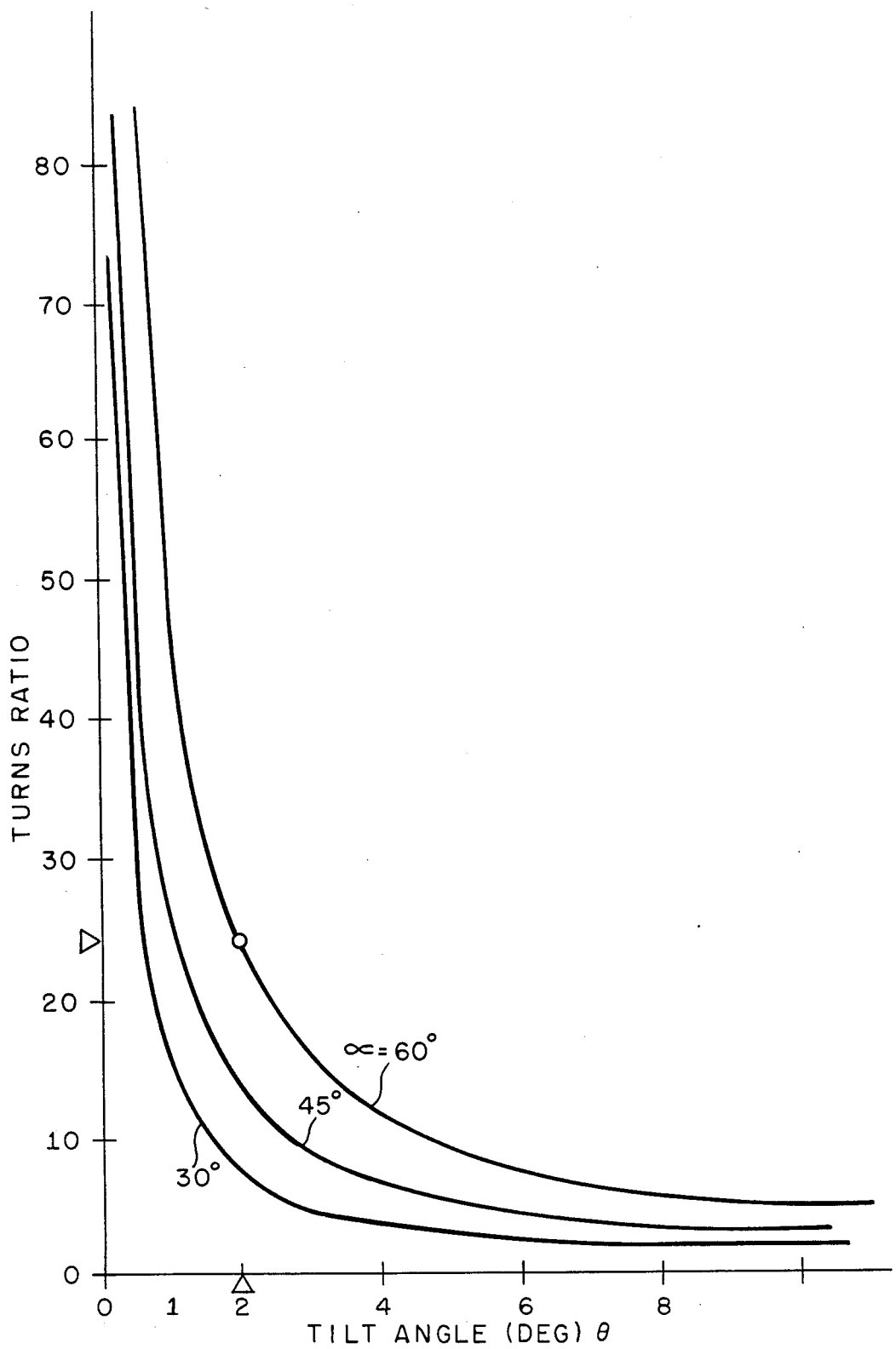
FIG. 3 is a graph depicting the relationship of the invention drive turns ratio related to two of the design parameters shown in FIG. 2.

FIG. 3 is a plot of the TR equation for α equal to 30°, 45° and 60°. As can be seen in FIG. 3, turns ratios from 1:1 to greater than 80:1 are easily achieved by adjusting or changing the ball skew angle θ. The ball skew axis θ may be changed by substituting alternate members 9 into input member 1 as shown in FIG. 1.

Referring again to FIG. 1, the support balls 7 are preloaded at the two contact points 16 and 17 at the fixed ring 6 and the output ring 10 respectively by means of the loading diaphragm 11. The drive torque available by the drive is determined by the input torque and turns ratio but can be no greater than that which causes gross slip at the interfaces 16 and 17. This limit torque is determined by not only the traction coefficient as explained previously, but also by the normal load acting upon the balls 7 at the contact points 16 and 17. This load is developed by positioning the output member 12 in axial relation to the housing 14 by means of the adjusting nut 18 acting through the carrier bearing 50. The axial position of the output member 12 with respect to the position of the output ring 10 determines the axial deflection of the diaphragm 11 and, hence the axial preload between members 10 and 6 through balls 7.

The input member 1 is not only supported in all axes by means of the drive reduction mechanism, but also fit compactly, for example, within the cavity of conventional pancake type torquer armatures. This provides for ideal mechanization of the drive reduction device within the envelope required for the torquer armature.

The drive mechanism provides a less complex means of achieving a given turns ratio than is required for other traction drives. Additionally, ball bearing analysis and fabrication technology are well established and directly applicable to the present invention traction drive. The absence of slender cones and shafting such as is used in some traction drives results in increased system angular stiffness. Angular backlash is zero as is true of most other traction drives.

Figure 4A:
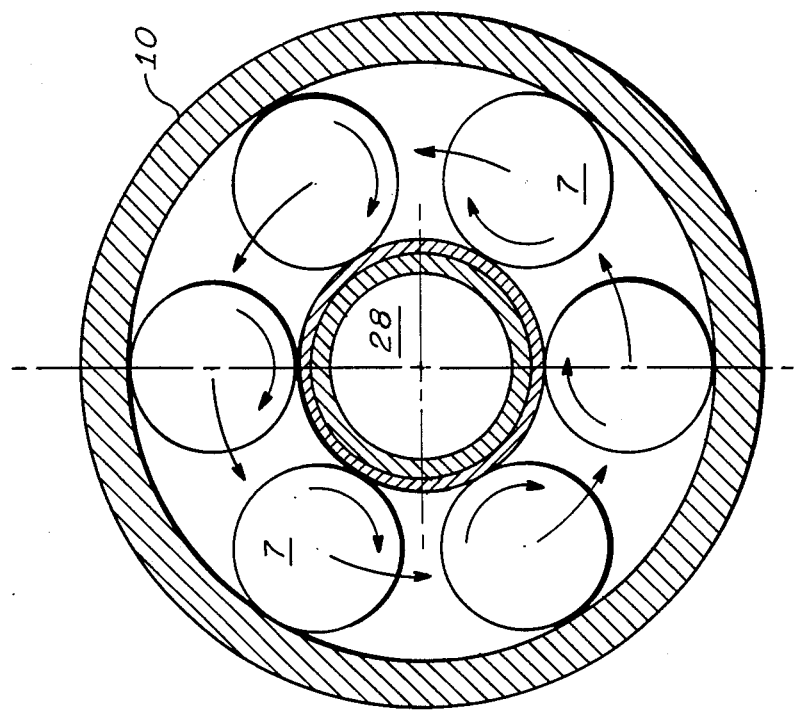
FIGS. 4 and 4a is a cross-section of the elements of the invention which provide a floating radial load reaction member for high torque levels and an alternate drive means.
Figure 4:
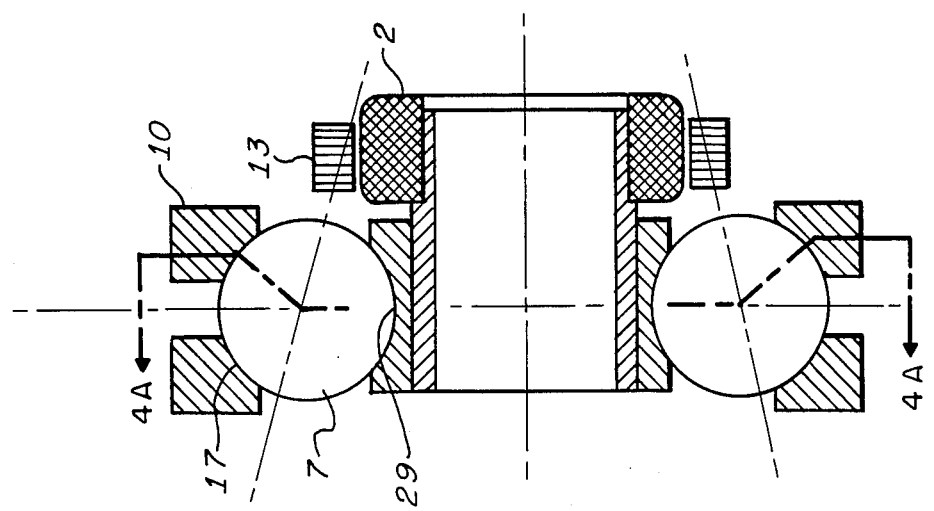

In the case of very large output torques which necessitates large axial preloads, the radial loads on the ball 7 support bearings 8 may become difficult to accomodate. FIGS. 4 and 4a identifies a configuration of the concept which reacts the radial load components of the axial load through the balls 7, thereby relieving the ball 7 support bearings 8 of this force component. In FIG. 4, the skewed axis 13 of the balls 7 are maintained as previously discussed but the radial load component of preload (axial load) is reacted through the floating inner load ring 28 through the inner contact points 29.

The apparatus in FIG. 4 permits an alternate drive means whereby the drive motor armature 2 shown in FIG. 1 is attached to the floating inner load ring 28 instead of to the input member 1. This configuration effects an additional turns ratio, TR', between output member 12 and input member 1 expressed by:

$$TR' = \frac{E - d/2}{2E - d(1/2 - \sin\alpha)}$$

Where
E = Ball 7 pitch diameter
d = Ball diameter

Figure 5:
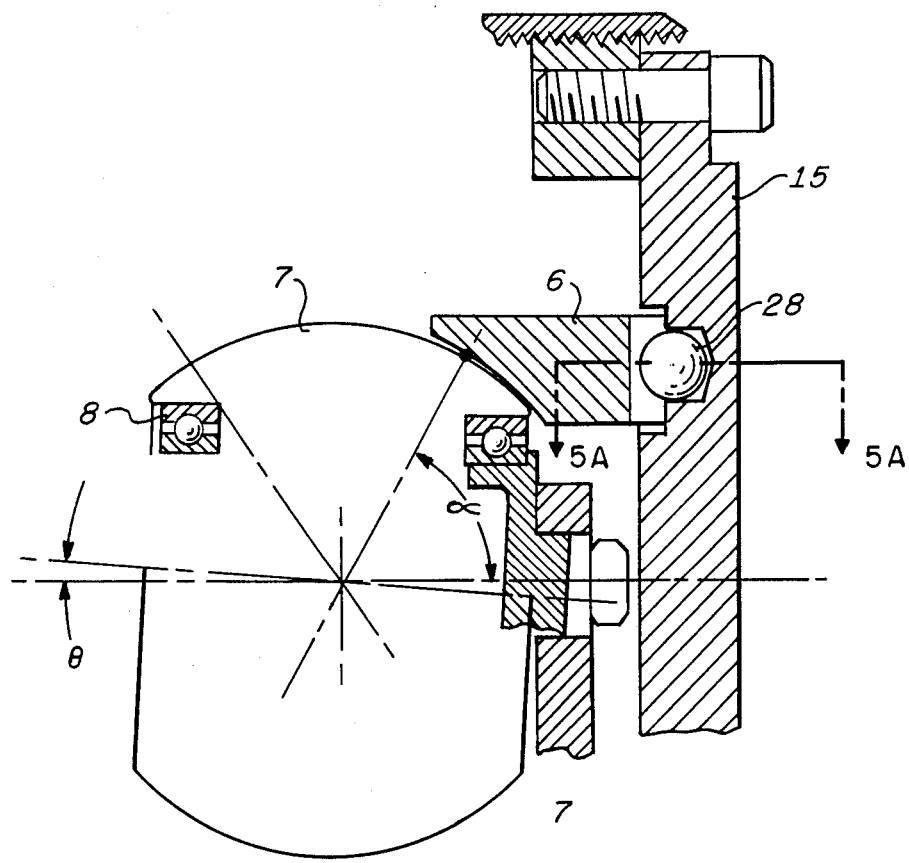
FIGS. 5 and 5a is an alternate configuration of that shown in FIG. 1 which provides a preload adjustment to accomodate higher torque.
Figure 5A:
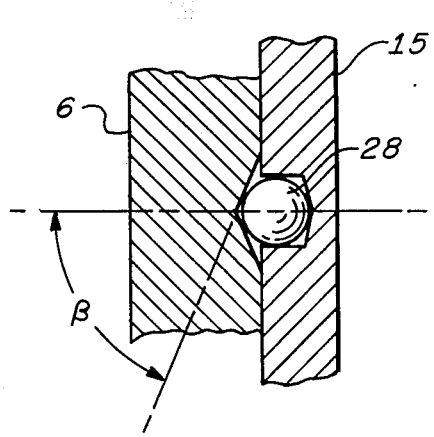

FIGS. 5 and 5a is a partial cross-section similar to that shown in FIG. 1 with a modification of the anti-rotation means of attaching bearing race ring 6 to housing member 15. This alternate configuration provides an inherent axial adjustment of the position of race ring 6 relative to housing member 15 as a function of drive torque by means of caming angle β on member 6 reacting against balls 28. This axial position change automatically increases the axial preload on balls 7 by means of the loading diaphragm 11 which results in increased tractive coupling capability to drive the increased torque without undue slip. The relationship of the axial preload change, $Y_A$, to the drive torque T, is expressed by:

$$Y_A = \frac{C}{\tan\beta} T$$

Figure 6A:
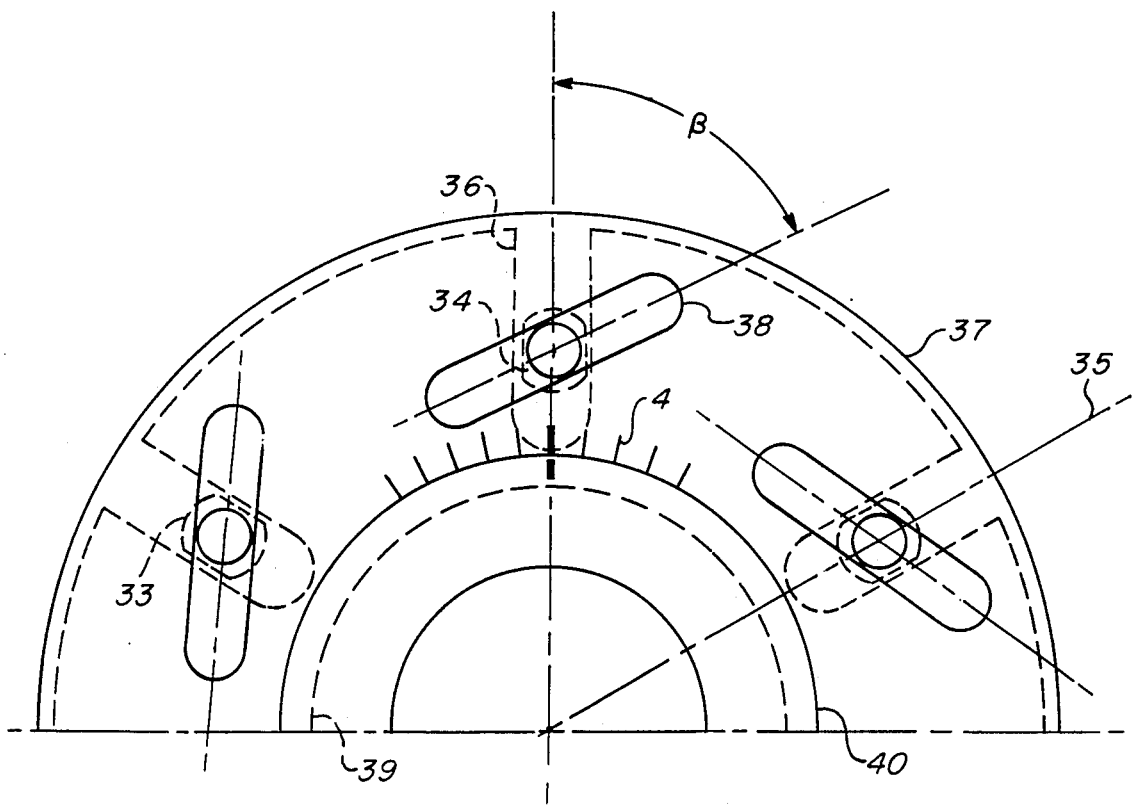
FIG. 6a is a partial view of a section of the configuration shown in FIG. 6.
Figure 6:
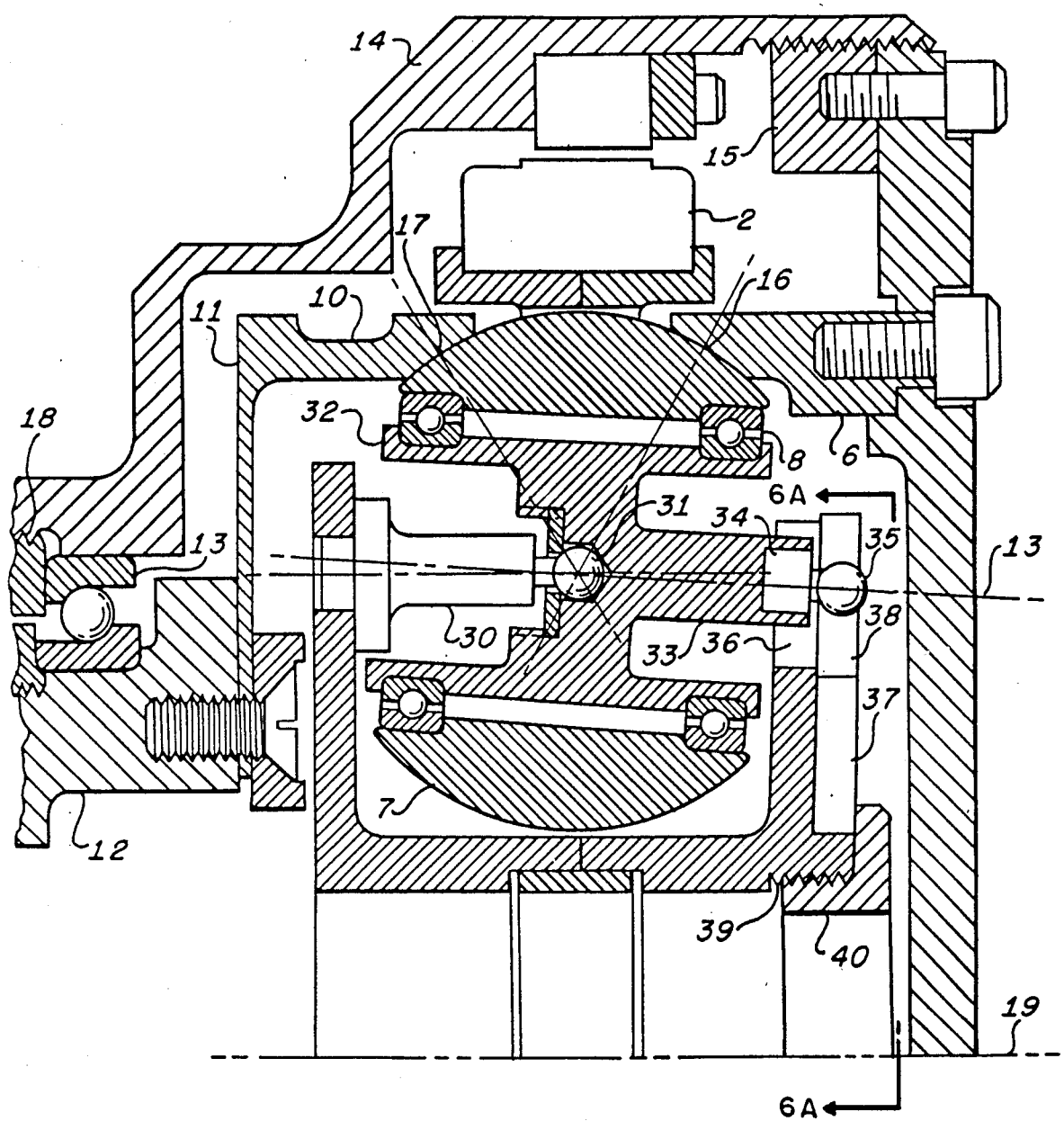
FIG. 6 is a modified configuration of that shown in FIG. 1 which provides for adjustment of turns ratio without parts substitution.

Where:
C = Constant based upon design parameters. An alternate means of setting a given turns ratio by selecting an associated ball skew angle θ may be provided by a configuration such as that shown in FIGS. 6 and 6a. The input member 1' is a revised form of input member 1 shown in FIG. 1. Post 30 attached to the flange of member 1' is terminated by a swivel ball 31 which pilots the ball carrier 32. The latter member 32 is provided with a guide arm 33 which has two positioning flats 34 and positioning ball 35. The flats 34 are fitted into radial slots 36 in a second flange of member 1'. These slots provide for purely radial motion only of guide arm 33 as well as prevent rotation of ball carrier 32 about an axis of swivel ball 31. Adjusting plate 37 is fitted with angular guide slots 38 which capture the guide arm 33 by means of ball 35. This adjusting plate 37 is guided on a journal 39 of input member 1' and locked in place by clamping collar 40. The ball skew angle θ is now adjustable by rotational adjustment of member 37 relative to the flange of member 1'. It is obvious that this adjustment effects all ball 7 axis θ equally so as to effect an equal turns ratio adjustment on each. A suitable means of calibration of this rotational adjustment and resultant turns ratio may be provided such as the graduations 41 shown in FIG. 6a. Referring to FIG. 6a, the adjusting slot 38 of member 37 may be configured in a variety of slopes and shapes so as to effect a given turns ratio sensitivity. As angle β in FIG. 6a is increased the turns ratio adjustment sensitivity of member 37 is lessened since a given rotation of member 37 relative to slot 36 results in a smaller change of skew angle θ and resultant turns ratio. The configuration shown in FIG. 6a is that of a 6 ball drive but alternate numbers of balls 7 may be configured.

While the invention has been described in its preferred embodiments, it is to be understood that the words which have been used are words of description rather than limitation and that changes may be made within the purview of the appended claims without departing from the true scope and spirit of the invention in its broader aspects.

I claim:
1. Traction drive apparatus having a variable turns ratio comprising
a rotatable input member disposed for rotation about an input axis,
a plurality of drive balls disposed for rotation within said input member, each said drive ball having a center and rotating about a drive ball rotational axis through said center, each said drive ball rotational axis being fixed with respect to each said drive ball, respectively, and disposed at a ball skew angle $\theta$ with respect to said input axis, said ball skew angle $\theta$ between drive ball rotational axes and said input axis controlling said variable turns ratio, a first outer race ring fixedly attached to a housing and a second outer race ring forming a rotatable output member, said drive balls being captured between said first and said second outer race rings such that torque is transmitted from said input member to said output member, each said drive ball having a point of contact with said first outer race ring on a line through said center which forms a preselected angle with said input axis and said ball skew angle $\theta$ affecting said variable turns ratio (TR) in accordance with $$TR = \frac{\sin(\alpha - \phi)}{\sin(\alpha - \phi) - \sin(\alpha + \phi)}$$

means for preloading said first and second outer race rings to control torque limits of said torque transmitted from said input member to said output member; and means for varying said ball skew angle $\theta$ between said drive ball rotational axes with respect to said input axis to vary said variable turns ratio between said rotatable input member and said rotatable output member.

2. The apparatus of claim 1 in which said input member includes an input carrier in which each of said drive balls is disposed for rotation about its drive ball rotational axis, ball bearings supporting said drive balls in said input carrier, said input carrier having an adjustable orientation in said input member where each orientation determines said ball skew angle between said rotational axes of said drive balls and said input axis.

* * * * *